(12) United States Patent
Seitz et al.

(10) Patent No.: US 11,092,438 B2
(45) Date of Patent: Aug. 17, 2021

(54) LIGHT RECEIVER FOR POSITION REFERENCING

(71) Applicant: LEICA GEOSYSTEMS AG, Heerbrugg (CH)

(72) Inventors: Peter Seitz, Urdorf (CH); Thomas Ammer, Widnau (CH); Martin Winistörfer, Eichberg (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 551 days.

(21) Appl. No.: 15/984,131

(22) Filed: May 18, 2018

(65) Prior Publication Data

US 2018/0335304 A1 Nov. 22, 2018

(30) Foreign Application Priority Data

May 18, 2017 (EP) .................................... 17171834

(51) Int. Cl.
*G01C 15/00* (2006.01)
*G01J 1/42* (2006.01)
*G02B 6/42* (2006.01)
*G01C 3/08* (2006.01)

(52) U.S. Cl.
CPC ............ *G01C 15/006* (2013.01); *G01C 3/08* (2013.01); *G01J 1/4257* (2013.01); *G02B 6/4206* (2013.01)

(58) Field of Classification Search
None
See application file for complete search history.

(56) References Cited

U.S. PATENT DOCUMENTS

| 4,756,617 A | 7/1988 | Cain et al. |
| 4,895,440 A | 1/1990 | Cain et al. |
| 6,098,483 A * | 8/2000 | Syamoto ................. F16H 59/10 74/473.12 |
| 6,435,283 B1 | 8/2002 | Ohtomo et al. |
| 7,181,856 B1 | 2/2007 | Hanchett et al. |
| 7,372,011 B2 | 5/2008 | Green et al. |
| 7,394,527 B2 * | 7/2008 | Essling ................ G01C 15/002 356/4.01 |

(Continued)

FOREIGN PATENT DOCUMENTS

| CN | 1434269 A | 8/2003 |
| CN | 1545610 A | 11/2004 |

(Continued)

OTHER PUBLICATIONS

Website https://www.rp-photonics.com/stokes_shift.html, retrieved on Feb. 13, 2021. (Year: 2021).*

(Continued)

*Primary Examiner* — Eric L Bolda
(74) *Attorney, Agent, or Firm* — Maschoff Brennan

(57) ABSTRACT

A light receiver designed to determine a position or orientation relative to a reference light wherein the light receiver comprises an elongated rod-shaped light receptor with two ends, a light coupler, a light guide, and light detection means at one or both ends for detection of guided reference light and a signal processor to process the at least one detection signal of the detection means and to determine the position by an evaluation of the detection signal. The light coupler comprises light absorbing and emitting material like fluorescent or phosphorescent material.

9 Claims, 7 Drawing Sheets

(56) References Cited

U.S. PATENT DOCUMENTS

| | | | |
|---|---|---|---|
| 8,502,989 B1* | 8/2013 | Rossbach | G01S 5/16 356/614 |
| 2002/0033940 A1 | 3/2002 | Hedges et al. | |
| 2003/0136901 A1 | 7/2003 | Ohtomo et al. | |
| 2003/0174305 A1* | 9/2003 | Kasper | G01C 15/002 356/3.09 |
| 2004/0246498 A1 | 12/2004 | Kumagai et al. | |
| 2007/0024845 A1 | 2/2007 | Essling et al. | |
| 2009/0046269 A1 | 2/2009 | Essling | |
| 2011/0119937 A1 | 5/2011 | Winistoerfer | |
| 2012/0186059 A1 | 7/2012 | Goodwin et al. | |
| 2014/0204399 A1* | 7/2014 | Dumoulin | G01J 1/4257 356/623 |

FOREIGN PATENT DOCUMENTS

| | | |
|---|---|---|
| CN | 101975063 A | 2/2011 |
| CN | 103733025 A | 4/2014 |
| DE | 195 40 590 A1 | 4/1996 |
| KR | 20080070103 A | 7/2008 |
| WO | 2004/003474 A1 | 1/2004 |

OTHER PUBLICATIONS

European Search Report date of completion of the search Oct. 30, 2017 as received in Application No. 17171834.9.

Thermo Fisher Scientific, Inc., Fluorescent Labeling and Detection, retrieved from: https://www.thermofisher.com/us/en/home/about-us/partnering-licensing/license-our-technology/intellectual-property-licensing/fluorescent-labeling-detection-technology.html (2012).

Thermo Fisher Scientific, Inc., DyLight Fluors Technology and Product Guide, retrieved from: https://www.thermofisher.com/us/en/home/life-science/protein-biology/protein-labeling-crosslinking/protein-labeling/fluorescent-protein-labeling/dylight-fluors-technology-product-guide.html (2012).

* cited by examiner

LIGHT RECEIVER FOR POSITION REFERENCING

CROSS-REFERENCE TO RELATED APPLICATIONS

This application claims priority to European Patent Application No. 17171834.9 filed on May 18, 2017. The foregoing patent application are incorporated herein by reference.

FIELD OF INVENTION

The present invention relates to a light receiver to determine a position or orientation relative to a reference light, a position measuring system, and a position determination method.

BACKGROUND

A measurement task often occurring in practice is the determination of the absolute or relative position in space of a point or an object. This is required, for example in construction work, surveying tasks, building and operation of heavy machinery, or the monitoring of relative displacement in buildings, bridges, tunnels, dams, etc. Traditionally, this measurement problem is solved with known instruments such as levelling boards, surveyor's staffs, measuring rods or rulers. These instruments rely on a human observer to determine the relative position of a reference point or an object with respect to the measurement rod.

This measurement process can be automated with the help of a light-generation device and an active measuring rod, capable of determining the absolute distance of incidence of a laser beam or a sheet of light (also called laser levelling). In the technical field of light leveling or positioning, often a laser rotator or a line laser is used to span a leveling plane which can be horizontal, vertical or tilted by a desired angle. The laser plane is detected by a laser receiver, which detects the striking position of the laser inside a detection window to determine the receiver's position relative to the laser plane. The accuracy of position determination has to be in the millimeter range or below, wherein also linearity of the position readout is an important aspect. The sheet of light can be generated, for example, with a laser beam and a cylindrical lens in the path of the laser beam. As said, a laser rotator or a line laser is used to span a leveling plane which can be horizontal, vertical or tilted by a desired angle. The laser plane is detected by the light receiver, which detects the striking position of the laser inside a detection window to determine the receiver's position relative to the laser plane. The detection window, or receiver window, is the area at the light receiver device, which is embodied to detect the light beam, in particular the position of the light beam's striking point within the detection window for determining the relative position of the laser-beam's axis and the receiver device in at least one direction. In many embodiments, the center in the half of the length is the desired level of the laser beam and the receiver indicates a deviation from this ideal position by indicative or quantifying means. The electronic reception of the laser beam allows an extension of the range of the laser leveling, usability under sunlight conditions, etc. Many types of laser receivers are known, with many different functional, performance and cost advantages compared to their competitors. A rotating or scanning laser beam emitter produces a beam that sweeps past the receiver and generates laser pulses of short duration but of high bandwidth in the detection window. In contrast, continuous laser transmitters generate a continuous laser radiation of a narrow bandwidth at the modulation frequency. Although the sensor element of the receiver can be the same for both types of laser levels, the signal conditioning and evaluation in the receiver is different.

Some examples of such laser leveling implementations are U.S. Pat. No. 6,435,283 showing a rotating single beam laser transmitter, or U.S. Pat. No. 4,756,617 showing a continuous 360° laser plane generated by directing a laser at a conical surface, wherein typically an amplitude modulated laser source is used. Those two principles of projecting a laser line are also referred to as line lasers with a scanning line or line lasers with a continuous laser line, wherein the light can be modulated.

There are different techniques known to determine the striking position of the light in the receiver window. One approach of determining the position of a light beam is by usage of photodiodes or arrays of photodiodes. U.S. Pat. No. 7,372,011 describes a linear array of (parallel) photodiodes with associated weighting circuits. The weighting circuits are used to determine whether the receiver has been struck by a laser beam or by a strobe light.

DE 19540590 A1 relates to a light receiver for determining a position using the reference light of a laser rotator. The light receiver consists of at least two, preferably three line-shaped separate receiving elements (such as three lines of photo diodes) which are not position sensitive and which are arranged in a defined angular position to each other, for example forming together the shape of the letter "N". The receiving elements each generate signals responsive to the time of a stroke of the rotating reference laser beam which passes the three rods in sequence, whereby these temporal signals due to the non-position-sensitivity are independent of the point of impinging on the respective element. Each detection line shall show the same signal behavior no matter which one of the photo diodes of the line is hit by the reference light. This is the condition that the time difference (or ration of the time durations) measured using the three signals of all three optical receiving units as start and stop signals is indicative of the height in which the laser beam strikes the "N". In other words, the relative timing of the electrical signals generated by the three linear receivers arranged in defined angular position to each other indicate in which height the rotating laser beam sweeps over the N-shaped receiver. However, the light receiver according to DE 19540590 A1 is quite complex and does not satisfy nowadays precision demands. As a further disadvantage, the size of the light receiver is constraint as the larger the height of the N-shaped device, the longer the line-shaped receiving elements, the higher the electrical noise and the manufacturing costs of the complete device.

U.S. Pat. No. 7,394,527 B2 teaches different measurement principles of an active measuring rod-shaped light receiver. One preferred method makes use of a tubular light-guide filled with dispersive material, and at both ends of the tubular light-guide a photodetector is placed. Since the dispersive material is coupling more light out of the light guide the longer the distance to a particular photodetector is, a comparison between the signal strengths of the two photodetectors i.e. the amplitude of the light detected provides a measure of the position where the incident light is hitting the tubular light-guide. However, this method has a couple of disadvantages. It works for example only with pulsed light and the principle relies on scattering which means that progressive light loss along the length of the lightguide takes effect which weakens the detectable light, and hence aggravates the signal processing, for example due to a worsened signal-to-noise ratio (SNR).

BRIEF DESCRIPTION

It is therefore an object of some embodiments of the present invention to provide an improved light receiver and an according measuring system for determining a position relative to a reference light.

Some embodiments of the present invention relate to a light receiver designed to determine a position and/or orientation relative to a free reference light beam or light fan. "Light" is to be understood not only as light in the visible range, but with shorter or longer wavelengths, too. Preferably, the reference light is generated by a laser source or a SLED. Such a reference light is disclosed for example by M. Winistorfer et al. in US patent application No. 2011/0119937 A1 which discloses a light sheet covering 360 degrees generated with a reference laser beam rotating about an vertical axis. Preferably, the position of the present invention is specifying a vertical offset to a reference plane defined by the reference light.

The light receiver comprises an elongated rod-shaped light receptor with two ends, a light coupler and a light guide. "Elongated rod-shaped" means not necessarily that the light receptor is strictly straight with a longitudinal axis, but comprises convoluted forms, such as the shape of the letter "U" (second end bent back to the first end), too. Also, the cross section of the light receptor is not necessarily circular, but is for example rectangular. The light receiver further comprises light detection means designed for light detection at one or both ends, for example one or more optoelectronic sensor or photodetector, e.g. an Avalanche Photo Diode (APD), PIN-Diode, Single Photon Avalanche Diode (SPAD) or charge coupled device (CCD).

The light coupler and the light guide are designed to receive and conduct at least part of the reference light impinging on the light receptor towards one or both ends such that reference light is detectable by the detection means. The light detection means are designed to put out at least one signal responsive to reference light detected at a respective end of the light receptor. The light receiver further comprises a signal processor to process the signal putted out by the light detection means and to determine the relative position and/or orientation by evaluation of the signal.

According to some embodiments of the invention, the light coupler comprises at least one light absorbing and emitting material, preferably fluorescent and/or phosphorescent material.

In other words the light receiver has a certain detection window and the rod shaped light receptor is designed to "capture" reference light impinging at some position along the detection window such that it can be guided to one or more detection means at one or both of its ends to be detected there whereby according to the invention the reference light is captured and inserted into a light guide using the principle of light absorbance and emittance. Optionally, the light absorbing and emitting media (light coupler) is an integral part of the light guide, for example embedded particles, emulsion, liquid solution, etc. in a waveguide designed light guide.

Preferably, the light coupler and the light guide are designed such that impinging reference light is absorbed at least partly by the light coupler and at least part of light emitted subsequentially or in reaction by the light coupler is conducted by the light guide.

Preferably, the light guide is guiding for light (in the wavelength region of the light coupled in by the light coupler and/or is guiding light virtually lossless. As another option, the light guide is designed as a multimode or singlemode optical waveguide based on the principle of guided waves or as a light pipe relying on total internal reflection, particularly wherein the light guide is a fiber-optic light guide, specifically a glass, polymeric or quartz fiber-optic light guide and/or comprises a guiding inner or core section filled with a liquid. In the latter case, the liquid preferably is a fluorescent liquid such that the liquid acts both as light guide and light coupler.

Optionally, the at least one light absorbing and emitting material is designed to absorb reference light and consequently emit light of a wavelength different to that of the reference light (stroke shift), preferably wherein the wavelength difference is at least 12 nm, preferably at least 20 nm. Optionally, the light absorbing and emitting material and the light detection means are mutually aligned such that the wavelength of the emitted light corresponds with the maximum sensitivity of the light detection means. Said otherwise, the light absorbing and emitting material is chosen such that it emits light with a wavelength especially suitable for the detection or vice versa. As a another option, the light receptor comprises an optical filter to filter out light with a wavelength other than the wavelength of the light emitted by the light absorbing and emitting material. The filter is for example placed right before the detection means and/or a step before around the light guide such that no unwanted light is coupled into the light guide from the first.

As another option, the light absorbing and emitting material is designed to emit light to a different solid angle than that of the incident reference light, in particular emits light omnidirectionally and/or in case of an optical waveguide as a light guide, emits light within the angle of acceptance of the optical waveguide.

The signal processor is preferably configured to determine the position and/or orientation based on either a Time-of-Flight difference and/or phase difference of light detected at both ends, intensity of detected light, rise and decay times of detected light, and/or frequency and/or spectral intensities of detected light. As can be seen, usage of light absorbing and emitting material offers advantageously a wide range of signal detection resp. position determination possibilities.

In some preferred embodiments, the light receptor is divided into two parts by an optical barrier such as a silver lacquer, a reflective coating, a reflector or mirror such as a reflective coating, an absorber or prism, preventing light transmission between the two parts, and the detection means are designed to detect light at each end. Alternatively or additionally, the light receptor is subdivided as it comprises at least two, particularly three, coupling and guiding elements of different length, arranged adjacent and parallel to each other and dividing the light receptor in at least two, preferably three, parts and wherein the detection means are designed for detecting light of each coupling and guiding element, particularly at the same end.

Additionally or alternatively, the light absorbing and emitting material is distributed non-uniformly, particularly with a continuously varying distribution or density, along a receiving length of the light receptor. Hence, the light coupling rate differs along the length of light receptor. Preferably, the light receptor comprises at least two coupling and guiding elements arranged adjacent and parallel to each other and with non-uniform distribution of light absorbing and emitting material opposed to each other (for example such that the light coupling efficiency of the first element increases and that of the second element decreases from the first end to the second end) and/or the detection means are designed for detecting light at only one end. Detecting light at only one end has the advantage of a simplified layout of the light receiver and lower manufacturing costs.

As another option, the light coupler comprises at least two light absorbing and emitting materials with different stroke shifts (hence, light of two different wavelengths is generated by the light coupler and detectable by the detection means). Optionally, the two light absorbing and emitting materials are distributed alternating along a receiving length of the light receptor.

Alternatively or additionally, the light coupler comprises at least two phosphorescent materials as light absorbing and emitting materials, whereby the two phosphorescent materials have different decay times. Preferably, the position and/or orientation is determined based on a time difference of the decay times as a single impingement of reference light (one position of the light beam or fan) results in two signals with different time stamp.

As another option, light guide serves as a, particularly virtually lossless, light propagation path of defined length for light coupled into the light guide by the light coupler and the position and/or orientation is determined based on light propagation speed of the reference light propagating in the light guide.

As a further option, a receiving length or detection window of the light receptor is at least 1 cm, particularly at least 0.5 m, specifically at least 2 m and/or the signal processor comprises a time measurement unit for determining a time or time difference of the signals.

A further subject of some embodiments of the invention is use of a light receiver according to the invention for determination of a position and/or orientation relative to a reference light.

A further subject of some embodiments of the invention is a position measuring system comprising a light emitter with a light source, preferably a laser source or a SLED, for directional emittance of light in form of a free light beam or light fan serving as a position reference, particularly a construction laser. Preferably, the wavelength of the light emitted by the light source is in the blue or UV-range. The system further comprises a light receiver designed to determine a position and/or orientation relative to the reference light. The light receiver comprises an elongated rod-shaped light receptor with two ends, a light coupler and a light guide. The light receiver further comprises light detection means designed to put out at least one signal, for example an electric signal, responsive to reference light detected at least one of the respective ends of the light receptor. The measuring system determines the relative position and/or orientation by an evaluation of the at least one signal. According to the invention, the light coupler comprises at least one light absorbing and emitting material, particularly fluorescent and/or phosphorescent material.

Another object of some embodiments of the invention is a position determination method for determination of a position and/or orientation relative to reference light with the steps of emitting of reference light in the form of a free light beam or free light fan, receiving at least part of the reference light with a light receiver by coupling reference light into a light guide, wherein received light travels in the light guide along a propagation path. The method further comprises the steps of detecting of the received and guided light at least one end of the propagation path, resulting in at least one detection signal and determining of the position and/or orientation based on an evaluation of the at least one detection signal. According to the invention, coupling reference light into the light guide comprises absorbing and consequently emitting (or: re-emitting) reference light by at least one light absorbing and emitting material, particularly fluorescent and/or phosphorescent material.

Optionally, the method comprises determining of the position and/or orientation based on comparative evaluation of at least two detection signals, whereby the at least two signals correspond to one and the same receiving operation of reference light. In other words, the at least two signals have one and the same root or genesis.

A further subject of some embodiments of the invention is a computer program product having program code which is stored on a machine-readable carrier or embodied as an electromagnetic wave, the program code being configured to control and carry out the method for position and/or orientation determination according to the invention.

The embodiments of the invention offer the advantage that after reference light is inserted into the light guide, it travels advantageously with low losses compared to light receivers of the state of the art to the detection means. This enables for example relatively large detection windows and thus allows for position determination in a wider space or with more space for free movement of an object the light receiver is connected to and the position or orientation is to be referenced.

Using light emitting and absorbing material has the specific advantage of an enhanced conversion of the propagation direction of the reference light. Such a redirection is necessary to some degree as the detection means do not lie in the propagation direction of the reference light, but are for example even perpendicular hereto. As the light emitting and absorbing material resp. particles act as light point sources, it remits light in the whole solid angle and therefore reference light (which lies within the acceptance angle of the light guide) is coupled into the light guide by which it is guided to the detection means.

Using specifically light emitting and absorbing material with a stroke shift offers the additional advantage that absorption and emission spectra can be (at least partly) separated wherefore the transmittance of emitted reference light in the light guide is not (or only to a low extend) weakened by re-absorption even if light emitting and absorbing material is present in the light guide, thus enabling a low-loss propagation over comparatively large distances. As a result, the signal strength resp. the SNR is improved or seen otherwise the intensity of the reference light can be lowered without reducing measurement range compared to measurement systems of the state of the art. The SNR is even further improved due to the fact that the light emitting and absorbing material can be chosen such that is only (or almost only) sensitive to light of the wavelength of the reference light wherefore impinging ambient light does not result in insertion of light into the light guide and is therefore filtered out. If light emitting and absorbing material with a stroke shift is chosen, additional filters at the detection means can be easily used that filter out light of wavelengths different to the shifted one and/or filters around the light guide, which block the shifted wavelength and/or other wavelength different to the reference light wavelength.

As further advantages, the improved light receiver according to the invention enables position and/or orientation determination with high precision and thereby has a slimmer and less complex structure than devices of the state of the art. The present invention is applicable for different sorts of reference light, such as pulsed light and/or modulated light.

BRIEF DESCRIPTION OF THE DRAWINGS

The device according to the invention and the method according to the invention are in this case furthermore described in greater detail purely by way of example below on the basis of concrete exemplary embodiments illustrated schematically in the drawings, further advantages of the invention also being discussed. Specifically in the figures.

DETAILED DESCRIPTION

Figure 1A:
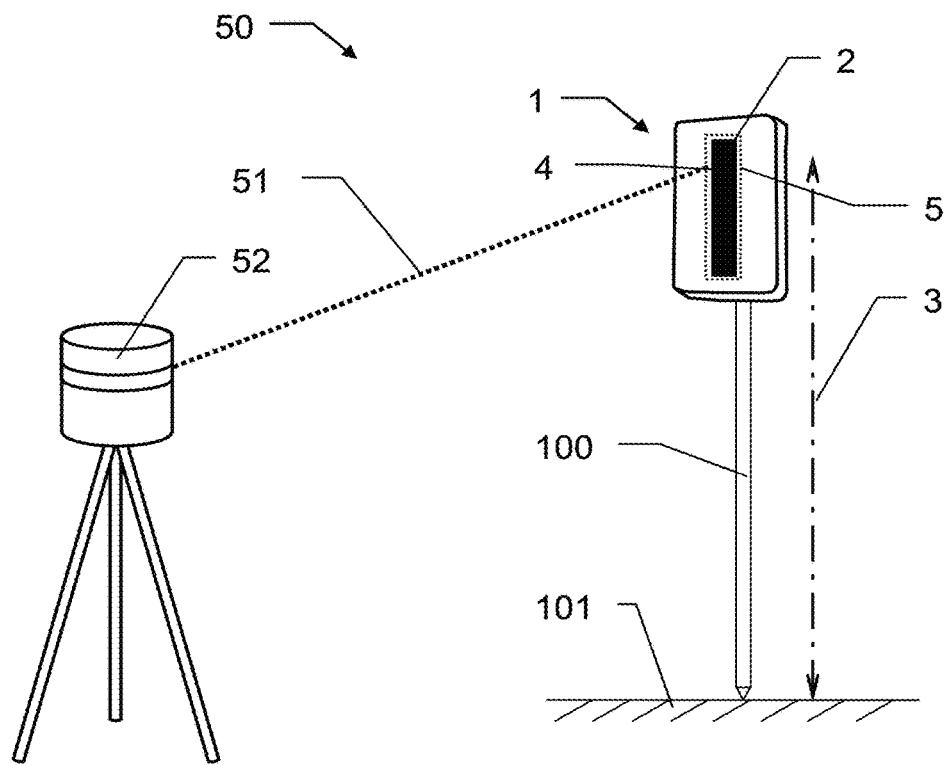
FIGS. 1a,b: show exemplary measuring systems according to the invention.

FIG. 1a shows an exemplary measuring system 50 according to the invention. In the example, the measuring system 50 is used for concrete working, where a plane concrete surface 101 has to be built, such as a building's ceiling. The system comprises a light emitter 52, e.g. a construction laser, that emits a laser light beam 51 of a light source such a as a laser source or SLED with a well defined direction of emittance as reference light, thus serving as a position reference. In the example, the direction of emittance is strictly horizontal. The system 50 further comprises a light receiver 1 spaced apart from the construction laser 52 for receiving the reference light 51 and determine a position thereof. The light receiver 1 comprises a light receptor 2 arranged on a support 100 of defined length and a signal processor (not shown) for processing signals of the light receptor 2. The signal of the light receptor 2 varies with the impinging position 4 of the reference light 51 and hence the position 3 of the light receiver 1 relative to the reference light 51. The signal processor is designed to determine the impinging position 4 and thereof the relative position 3 from the receptor signal, as will be explained in detail below. Thus, one can check if the surface 101 is plane i.e. if the impinging position 4 respectively the relative position 3 is the same throughout the whole surface 101. Based on the same principle, alternatively or additionally the orientation of the light receiver 1 (respectively of the surface 101) can be referenced, e.g. with a light receiver 1 equipped with a second light receptor (not shown) with a known relative position to the first light receptor 2 (for example parallel to the first receptor 2 with a known distance in between). Commonly, not only the direction of emittance of the reference light 51 is well known, but the (absolute) height of the emitter 52, too. Thus, the (absolute) height of the laser receiver 1 can be determined from its relative position 3. If the laser beam 51 is not emitted purely horizontal, the distance between the light emitter 50 and the light receiver 1 is determined and considered in the position determination process, too. As shown, in many cases of use, the laser receiving part 2 is attached to a leveling rod 100 or to machinery which has to be leveled (see also FIG. 1b). The point of intersection of a laser beam or laser plane at the reception window 5 of the receiver 1 is determined by measuring the striking position 4 of the beam's optical axis 51 within the receiving window 5. This position 4 is indicated to the user, in particular as a deviance from a desired or ideal striking position at the desired leveling position.

Figure 1B:
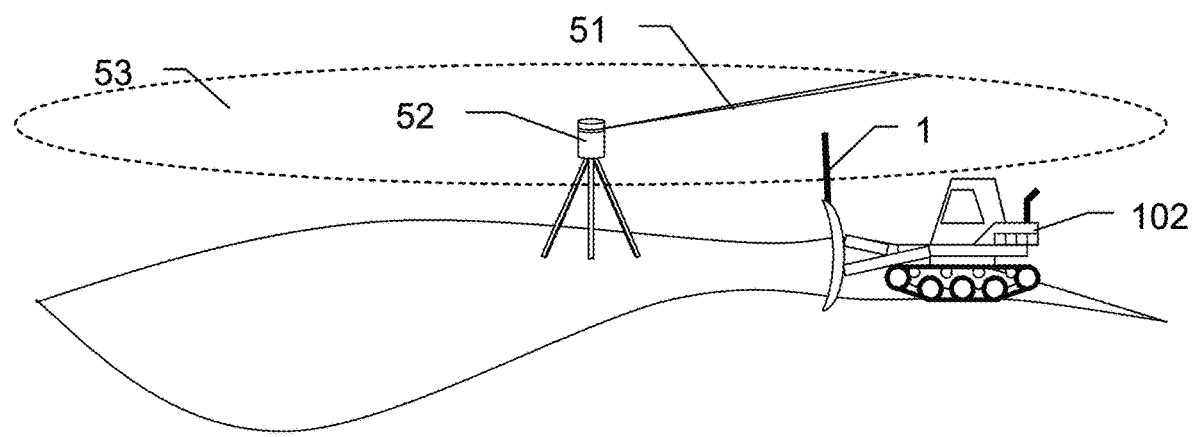

The light receiver 1 according to the invention has improved properties, particularly with respect to SNR and robustness and also with respect to manufacturing costs, and enables a relatively big or long detection window or receiving length 5, which is particularly advantageously in long-range applications as shown in FIG. 1b.

FIG. 1b shows a second exemplary leveling application with the system 50 according to the invention, wherein a laser rotator 52 is emitting a light beam 51 spanning a leveling or reference plane 53 for the dozer 102 which is equipped with a laser receiver 1 according to the present invention. With the help of the measuring system 50, the dozer 102 is enabled to determine continuously its position relative to the position reference defined using the reference light 51, for example its vertical offset to the reference plane 53. In the case of an absolute referenced laser rotator 52, the dozer 102 can finally determine its absolute position. Because of the long distance between the emitter 52 and the receiver 1, which amplifies uncertainties of the leveling plane 52 (e.g. its orientation) and because of surface bumps which can lead to a considerable change of the horizontal position of the dozer 102, a large (vertical) detection window as provided by the present invention is advantageously. The detection window according to the present invention is at least 1 cm, preferably at least 0.5, or for use cases as described above 2 m or more. Particularly advantageous for this application is a wide horizontal angular reception field of view, which can be facilitated by a light guide—even up to 360°.

Figure 2A:
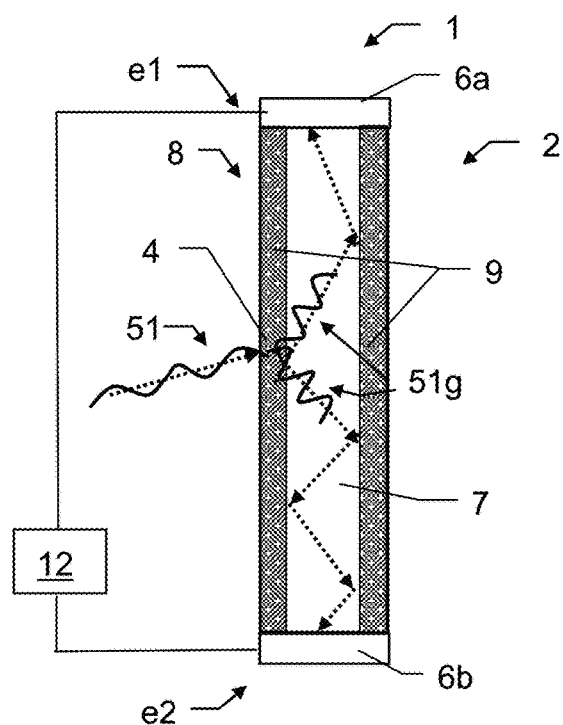
FIGS. 2a-d: show views of an embodiment of a light receiver according to the invention and details thereof.

FIG. 2a shows in a purely schematic cross sectional view an exemplary embodiment of a light receiver 1 according to the invention in detail. The light receiver 1 comprises an elongated rod-shaped light receiving part or light receptor 2 with two ends e1 and e2, a light coupler 8, a light guide 7 and light detection means 6a,6b. The light receptor 2 has a circular or elliptic cross section or preferably a rectangular cross section (cf. FIG. 2b) in order to avoid rotational effects. In this example, the light detection means 6a, 6b are designed as two light detectors 6a and 6b at each end e1, e2. However, in some embodiments, only one detector 6a or 6b is present and/or light is detected at only one of both ends e1 or e2. The light detectors 6a, 6b are for example embodied as Avalanche Photo Diodes (APD), PIN-Diodes, Single Photon Avalanche Diodes (SPAD) or charge coupled devices (CCD). The light detectors 6a and 6b are connected to a signal processor 12 of the light receiver 1 which processes the electric signals of the detectors 6a and 6b separately generated responsive to detection operations of reference light 51g detected at each end e1, e2. The light detectors 6a, 6b need not to be physically situated at the ends e1, e2 as shown, but in order to a different or easier layout may also be situated in the light receiver 1 spaced apart from the ends e1,e2, wherefore light transmitting elements such as waveguides or optical fibers are built in to transmit the received light 51g to the detectors 6a,6b.

To guide reference light 51 towards the detection means 6a,6b, reference light 51 impinging on the light receiving part 2 at impinging or striking position 4 is coupled into the light guide 7 by the light coupler 8. According to the invention, the light coupler 8 comprises light absorbing and emitting material 9, in this exemplary embodiment embodied as fluorescent or phosphorescent particles 9. The light absorbing and emitting material 9 forms in this example an outer wall of the receptor 2, enclosing the light guide 7. The light absorbing and emitting material 9 forms either a solid or is a liquid (or light absorbing and emitting particles distributed in a solid substrate or dispersed in a liquid). Alternatively to the embodiment shown in FIG. 2, the light coupler 8 and the light guide 7 are fully merged together, for example such that light absorbing and emitting material or particles 9 are distributed throughout the light guide 7, forming a multitude of (point) light sources (if stimulated by reference light 51) not only in an outer wall of the light receptor 2, but throughout its whole interior.

Light 51g emitted by the light absorbing and emitting material 9—consequently or subsequentially (or in reaction) to absorbance of reference light 51—travels inside the light guide 7, for example using the principle of total reflection, towards one or—as shown in this purely exemplary embodiment—both ends e1, e2, along a light propagation path defined by the light guide 7 to each end e1 and e2. The detectors 6a, 6b detect the respective light 51g and put out electric signals in response, which are transmitted to and evaluated by the signal processor 12. The evaluation of the electric signals allows for a determination of the impinging position and will be explained in more detail below.

The fluorescent or phosphorescent particles 9 emit light 51g in a different solid angle than the impinging reference light 51 or rather act as point light sources emitting light omnidirectionally. Hence, the propagation direction of impinging reference light 51 is so to say altered wherefore at least some of the reference light is coupled into the light guide 7 and thus travels towards one or both ends e1, e2 of the light receiver 1. Most light rays emitted by the light absorbing and emitting material will transition into total reflection inside the light guide 7, therefore allowing advantageously a practically lossless light transfer towards the detectors 6a or 6b, resulting in a high signal level and quality (SNR).

Examples of such fluorescent materials include the Alexa Fluor and the DyLight fluorescent dyes specified for example in the Thermo Scientific Pierce Fluorescent Products Guide entitled "Fluorescent labeling and detection", published in 2012 by Thermo Fisher Scientific Inc. Considering the popular wavelength of 633 nm produced either with a HeNelaser or a laser diode, fluorescent dye DyLight 633 would be appropriate, with an absorption maximum wavelength of 638 nm and an emission maximum wavelength of 658 nm.

As an option, the light absorbing and emitting material 9 is chosen such that it emits light 51g of a different wavelength than the impinging light 51 (stroke shift), for example of a shorter wavelength as symbolized in FIG. 2a or preferably of a longer wavelength. Using fluorescent or phosphorescent particles 9 with a stroke shift is particularly advantageous if they are not only disposed around the light guide 7 or in the outer areas of the light guide 7 but throughout its interior or in a core area of the light guide 7. The fluorescent particles 9 emit light 51g with a wavelength for which absorption is much weaker than for the incident reference light 51. Then, the fluorescent particles 9 do not (or at least only at a low degree) hinder or weaken the propagation of the light 51g coupled in through the light guide 7 even if the light coupler 8 is not separated from the light propagation path formed by the light guide 7. Said otherwise, at least a part of the converted light 51g, which is outside the absorption spectrum of the fluorescent material 9 will no longer interact with the fluorescent material 9 and propagate virtually lossless along the waveguide 7. Hence, the use of fluorescence enables a long receiving part of the light receiver 1 and thus a large detection window also when coupling particles 9 are dispatched throughout the interior of the light guide 7.

Dispatching coupling material 9 not only on or in the outer part of the light guide 7 has some advantages in relation to yield of transfer of impinging reference light 51 into the light guide 7 as for example a thicker coupling layer can be realised compared to a coating or outer wall area. For an air-clad waveguide 7, a coating is an option. For a waveguide 7 with cladding layer (like most fibers), the fluorescent coupling material 9 may be incorporated in the cladding, the core, or both (as long as it does not compromise the guiding properties of the light guide 7) Generally spoken, the use of a light receiving part 2 according to the invention may—depending on the coupling material—in some cases result in a lower yield of light coupling compared to solutions of the state of the art but the losses of light 51g coupled in resp. of light 51g travelling in the light guide 7 is advantageously strongly reduced as virtually no coupling out of guided light 51g takes place.

As a variant (not shown), the light guide 7 is embodied as a planar optical waveguides as for example being used in board (PCB) integrated optics. At least for smaller light receivers, those would have the advantage of a direct integration of electronic components (detection circuitry). The fluorescent coupling element 8 then for example is an additional layer on top of the planar/stripe waveguide 7. This solution however has a limited horizontal field of view.

As seen in the example of FIG. 2a, in the sense of the present invention the term "reference light" comprises not only the reference light 51 itself resp. its direct use for detection, but comprises also secondary light 51g generated from the impinging reference light 51 for example by fluorescent or phosphorescent material 9 with a wavelength shift as shown.

Figure 2C:
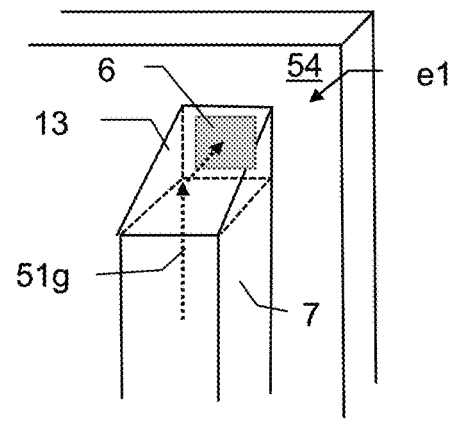
Figure 2B:
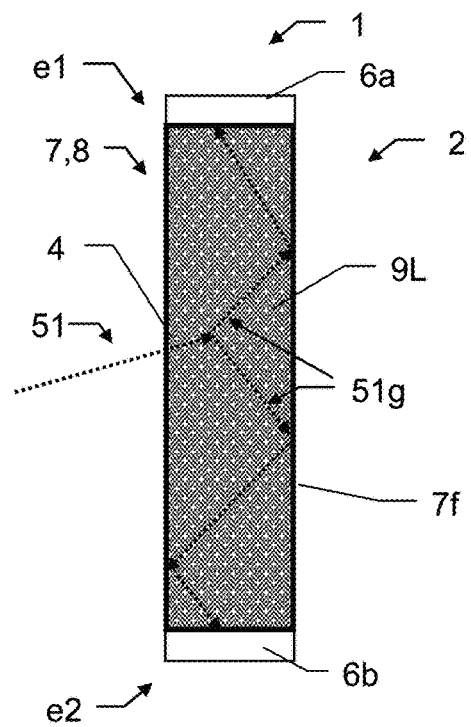

FIG. 2b shows another exemplary embodiment of a light receptor 2 according to the invention. In this example, the light guide 7 is realized as a hollow capillary optical fiber 7f, filled with a liquid medium 9L which is fluorescently active, preferably with a stroke shift and serves as light coupler 8. Such fibers 7c are commercially available for use in e.g. microbiological or chemical sensor applications. Soluble fluorescent dyes 9L are also available in a wide range of characteristics and concentrations. The liquid has a refractive index higher than the surrounding glass or polymeric fiber 7f, wherefore the liquid 9L can act as the light guiding core medium. Filling of the fiber 7f is being supported by the capillary effect. Optionally, T-shaped elements with a flat and transparent end section are used to terminate the fiber 7f while still being able to transmit light to the detection units 6a, 6b.

FIG. 2c shows a detail of the light receiver in a 3D-view. Shown is one end e1 of the light receptor 2 with an end part of the light guide 7 and part of a printed circuit board (PCB) 54 with a light detector 6. Guided light 51g is guided to the detector 6 by a deflection element 13 at the end of the light guide 7, for example a mirror.

Figure 2D:
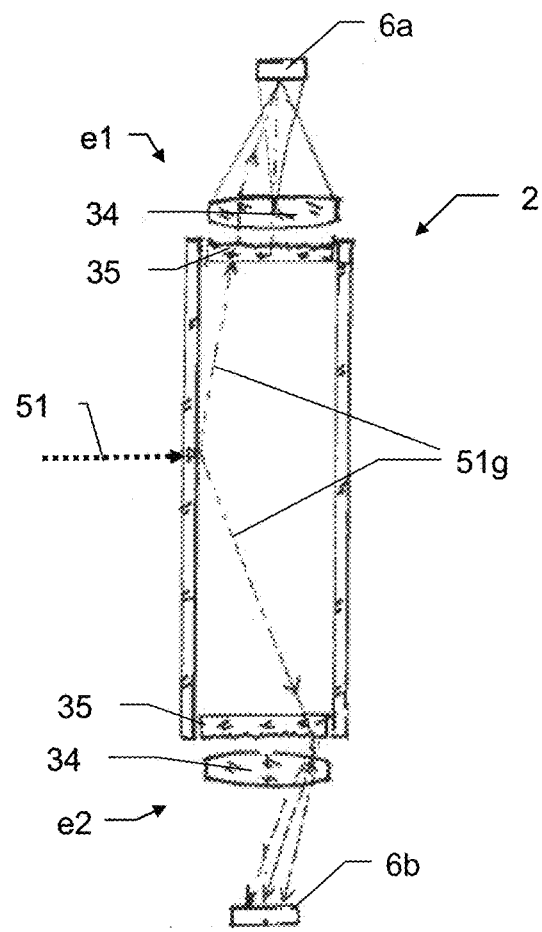

FIG. 2d shows in a cross sectional view a further embodiment of (parts of a) light receiver according to the invention. Impinging reference light 51 is coupled in and guided as guided light 51g towards both ends e1, e2 as described before (the light propagation path of the guided light 51g is much simplified in the FIG. 6b). At each end e1, e2, the light receptor 2 comprises a combined bandpass (such as an interference filter) and diffuser 35. At each end e1, e2, light 51g travels from the diffuse surface of the diffuser 35 to a lens 34 where it is collimated on the respective detector 6a, 6b.

Figure 3A:
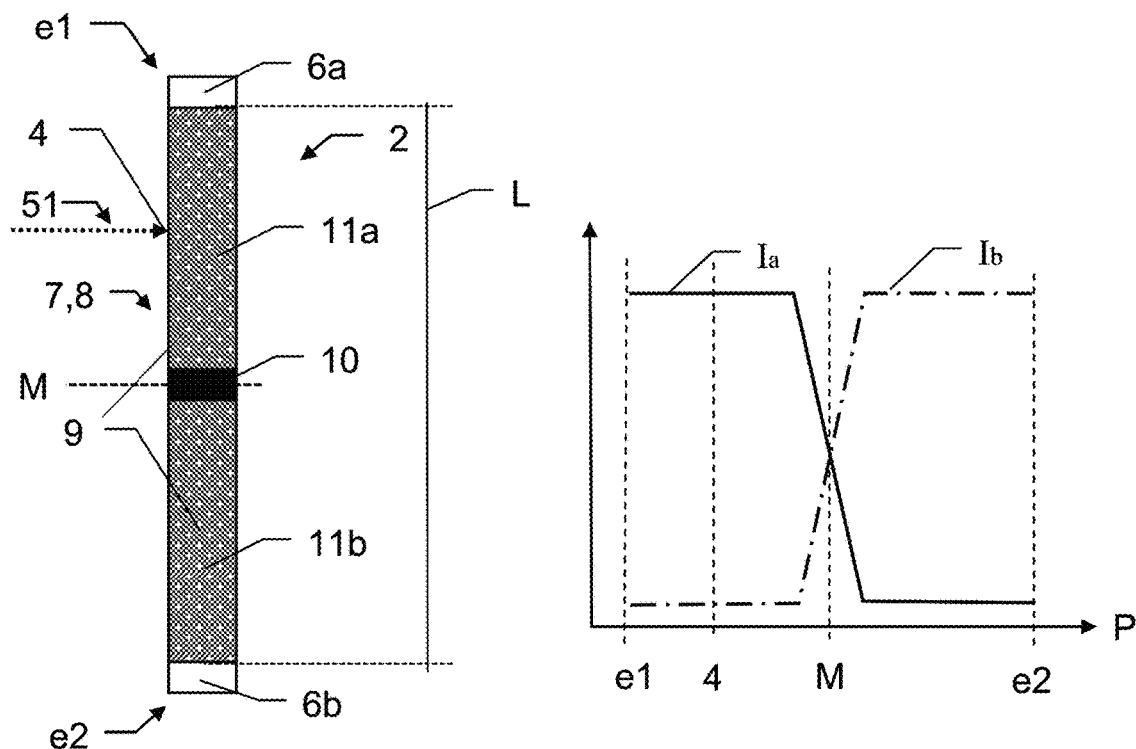
FIGS. 3a,b: show views of an example of a light receptor according to the invention and corresponding signals.
Figure 3B:
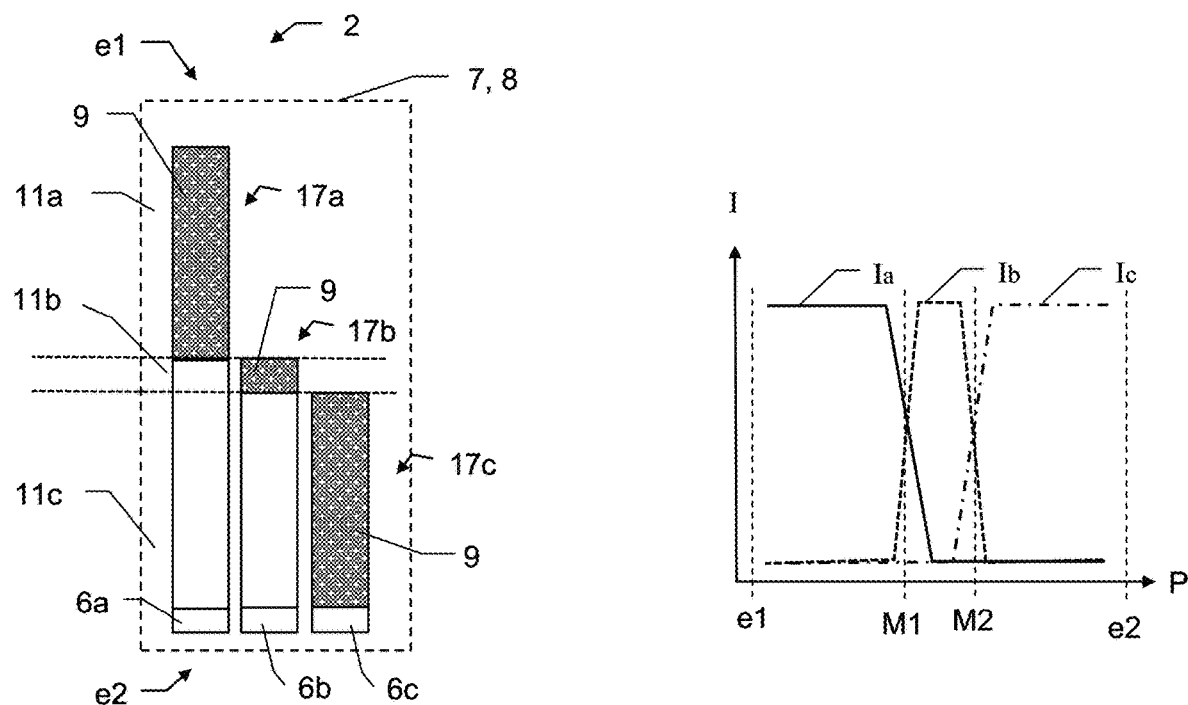

FIGS. 3a and 3b show two different exemplary embodiments of light receptors according to the invention.

On the left side of FIG. 3a, a cross sectional/2D-view of a light receptor 2 is shown with light guide 7 and light coupler 8 with light absorbing and emitting material 9, whereby the light absorbing and emitting material 9, for example fluorescent particles, is equally distributed along the (receiving) length L of the light receptor 2. At each end e1 and e2 a light detector 6a and 6b is present. In the present example, the light receptor 2 or the receiving length L is split by a splitting element 10 in two parts, preferably halves, 11a and 11b. The splitting element 10 is an optical barrier and for example designed as silver lacquer, an optical reflector or absorber or simply as an air gap of a few micron or more. The barrier prevents that light 51 incident in the "upper" half 11a (as shown) is guided to the detector 6b at the "lower" end e2, but is only guided to the detector 6a at the "upper" end e1, and vice versa. There it is detected by detector 6a (resp. detector 6b if impinging in the "lower" half 11b), which puts out a corresponding electric signal, illustrated on the right side of FIG. 3b as current Ia resp. Ib. As shown, an impinging position 4 results in a high "upper" signal Ia and a low "lower" signal Ib. As the intensity of the electric signal Ia, Ib is indicative of the impinging position P, an evaluation of the signal intensity Ia, Ib by the signal processor allows for determination of position P. To obtain an even larger detection window, two or more of the shown light receptors 2 can be stacked together one on top of the other.

FIG. 3b shows an improved embodiment compared to that of FIG. 3a, likewise based on signal intensity for position and/or orientation determination. In this embodiment, the light coupler 8 and light guide 7 of the light receptor 2 are embodied as an ensemble of three adjacent or neighboured coupling and guiding elements 17a-c of different length, splitting the overall receiving length or detection window in three parts 11a, 11b and 11c with its (virtual) borders M1 and M2 in between. Each element 17a-c comprises a light detector 6a, 6b, 6c and fluorescent material 9, whereby the fluorescent material 9 only covers the respective part 11a, 11b, 11c of the light receptor 2. Each part 11a-c comprises uniform light absorbing and emitting material, analogue to the embodiment of FIG. 3a. The rest of the element 17a, 17b (blank section in FIG. 3b) serves only as a light guide 7 and is without a light coupler. Hence, incident light is coupled in and thus detected by a respective element only if it is impinging in the respective part of the detection window 11a, 11b, 11c. For instance, element 17a couples and guides light if impinging in the "upper" part 11a and element 17b couples and guides light if impinging in the "middle" part 11b. Thus, detector 6a puts out a signal for light impinging in the "upper" part 11a, detector 6b for light of the "middle" part 11b and detector 6c for light of the "middle" part 11c, as schematically illustrated on the right side of FIG. 3b. In other words, the receiving window is not only divided in two sections like in FIG. 3a, but in three, whereby each receiving element 17a-c is "responsible" for one of them. Besides the enhanced bandwidth compared to the embodiment according to FIG. 3a, it is advantageous that all detectors 6a-c are situated at the same side which may facilitate the structural layout of the light receiver. Of course, the present concept could also be realized for example with two elements instead of three, merging the two elements for the "upper" and "lower" part into one analogue to the receptor of FIG. 3a. On the other hand, the concept of FIG. 3a may be realized with two coupling and guiding elements analogue to present FIG. 3b, omitting the optical barrier of FIG. 3a. A common advantage of the embodiments of both FIGS. 3a and 3b is that presence of light absorbing and emitting material 9 inside the light guide 7 is quite unproblematic even if light absorbing and emitting material 9 without a stroke shift is used as a weakening of signal intensity of guided light caused by fluorescent particles does not influence the position determination (at least up to some point). Compared to the embodiment of FIG. 3a, the present embodiment has the advantage of a better temperature conditioning as all detectors lie on the same side of the light receptor and thus the likelihood of divergent detector temperatures is reduced (even better is use of only one detector as shown in the following FIG. 4a).

Figure 4A:
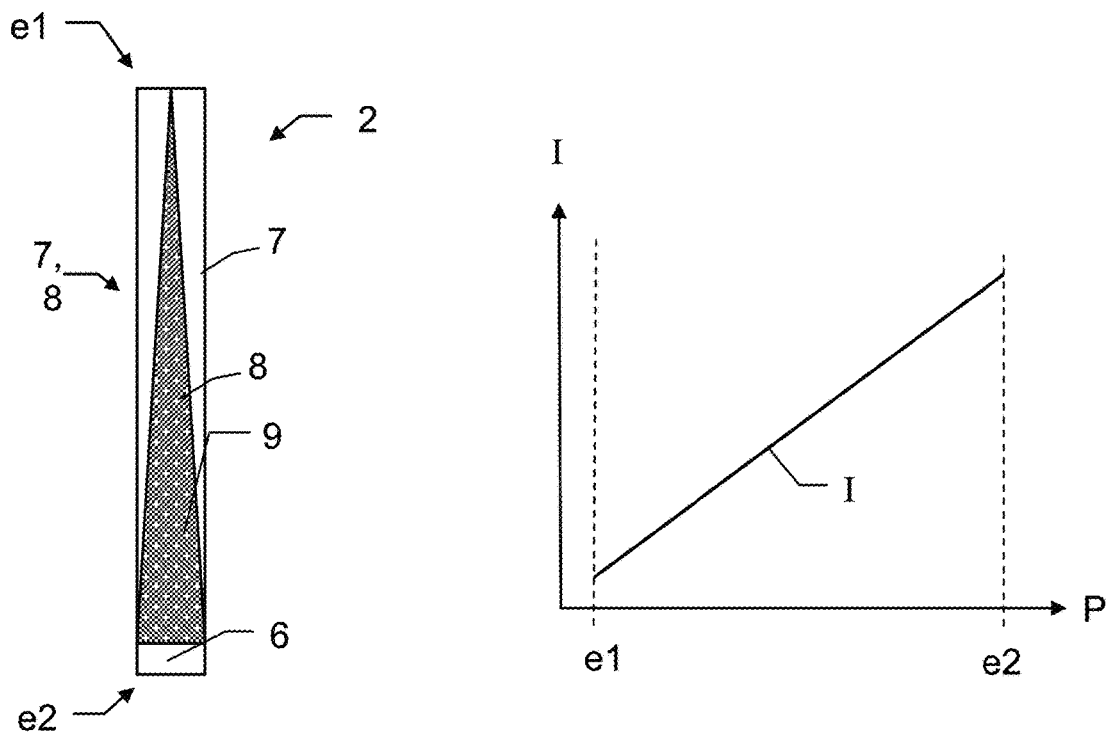
FIGS. 4a,b: show views of another example of a light receptor according to the invention and corresponding signals.

FIG. 4a shows another light receptor according to the invention. Like the embodiments according to FIGS. 3a and 3b, the measurement is based on signal intensity I, which is determined with the detector 6. Unlike the foregoing examples, the (effective) density or distribution of the fluorescent material 9 is not uniform along the length of the rod, but varies continuously, starting in the example with no (accessible) light absorbing and emitting material 9 at the first end e1 and with the maximum deposition at the second end e2. Thus, the more the impinging position P is nearby the second end e2, the more coupling material 9 is available or accessible, the more reference light is coupled in and hence the higher is the signal intensity I.

Figure 4B:
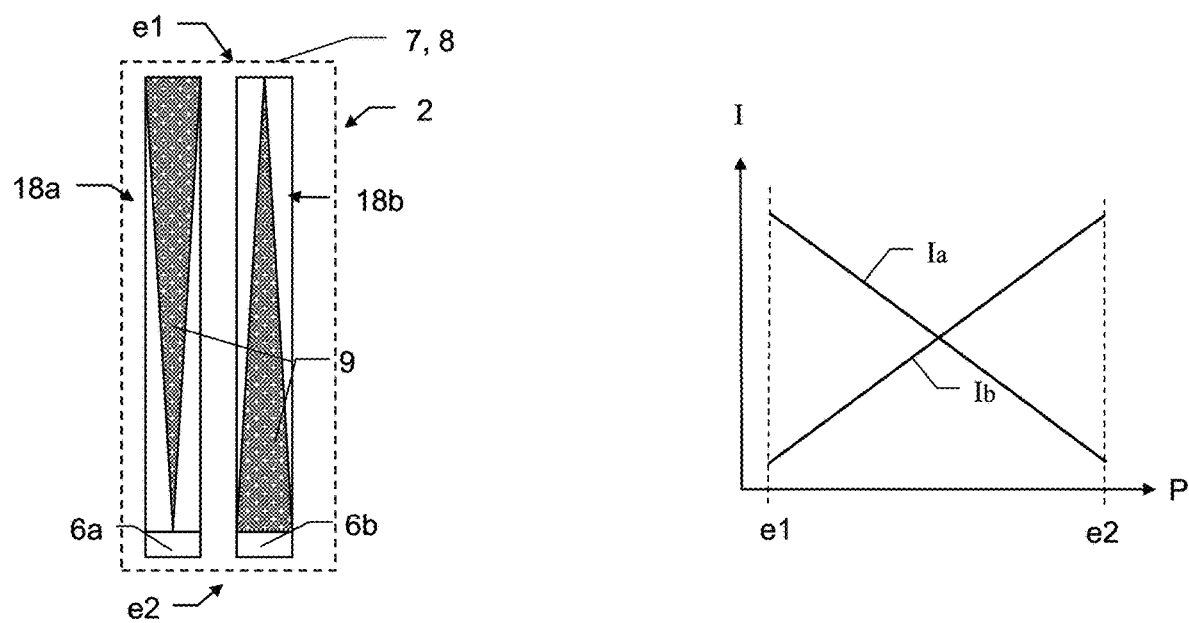

FIG. 4b shows another light receptor 2 following the concept as illustrated in FIG. 4a. Here, the light receptor 2 comprises two coupling and guiding elements 18a and 18b with non-uniform light coupling capability along the receptor length. The (accessible) densities or distributions of the fluorescent particles 9 of the two elements 18a, 18b are opposed to each other: the light absorbing and emitting capability of the first element 18a diminishes linearly from the first end e1 to the second end e2, whereby the fluorescent density of the second element 18b diminishes linearly from the second end e2 to the first end e1, resulting in continuous rise respectively fall of the detected signal intensity Ia resp. Ib. The position P and/or orientation is determined by a differential evaluation of both signals Ia, Ib.

As an alternative to a second element 18b, the element 18a comprises two sorts of fluorescent material with different stroke shifts, resulting in the emittance of light with two different wavelengths, whereby the density of one fluorescent material varies continuously from the first end to the second end and of the other fluorescent material continuously from the second end to the first end. Hence, the signal intensities of guided light of the first wavelength and of the second wavelength are alternating to each other, analogue to the signal intensities Ia and Ib as shown.

Figure 5:
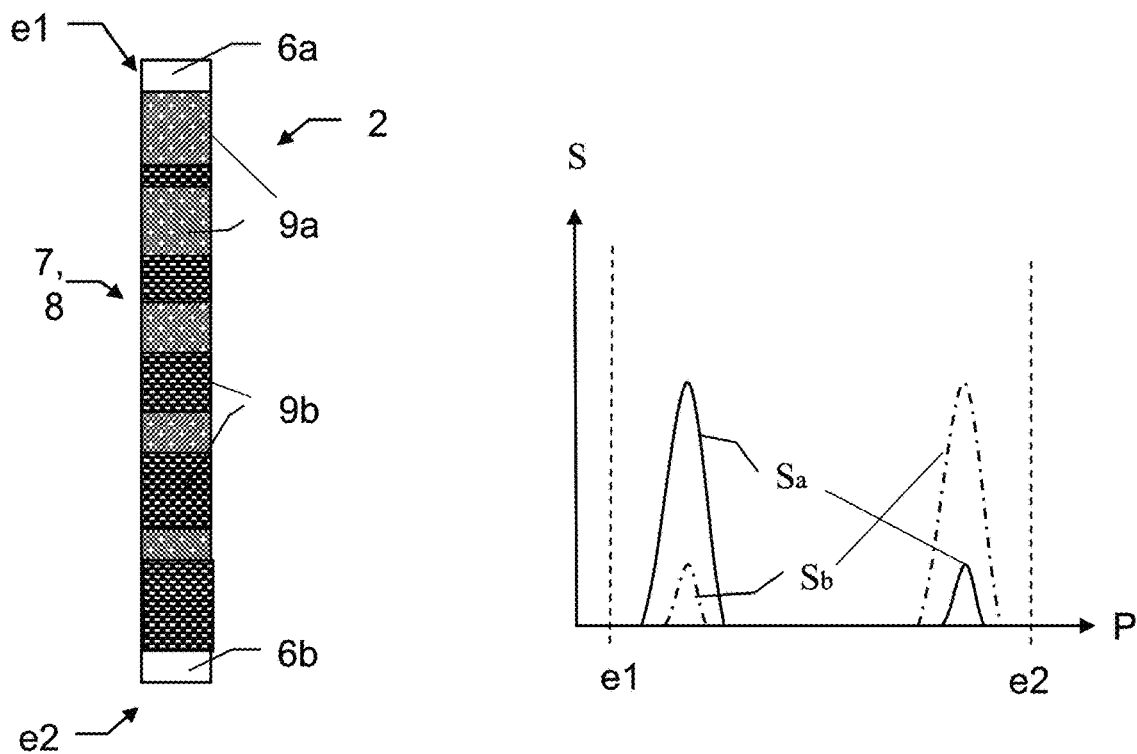
FIG. 5: shows a view of a further example of a light receptor according to the invention and corresponding signals.

FIG. 5 illustrates another embodiment of a light receptor 2 according to the invention. The light receptor 2 comprises to different light absorbing and emitting materials 9a and 9b with different stroke shifts such that the first light absorbing and emitting material 9a emits light of a first wavelength and the second one 9b emits light of a second wavelength different to the first one. The two materials 9a, 9b are distributed alternating along the length of the rod, whereby the relation of one material to the other is not constant but continuously varying from one end e1 to the other end e2 as shown in FIG. 5, such that at in direction to the "upper" end e1 the first material 9a increases and the second material 9b decreases and vice versa. The position is determined by a comparative evaluation of the signals Sa of the detector 6a and Sb of the detector 6b as indicated on the right side of FIG. 5.

Figure 6A:
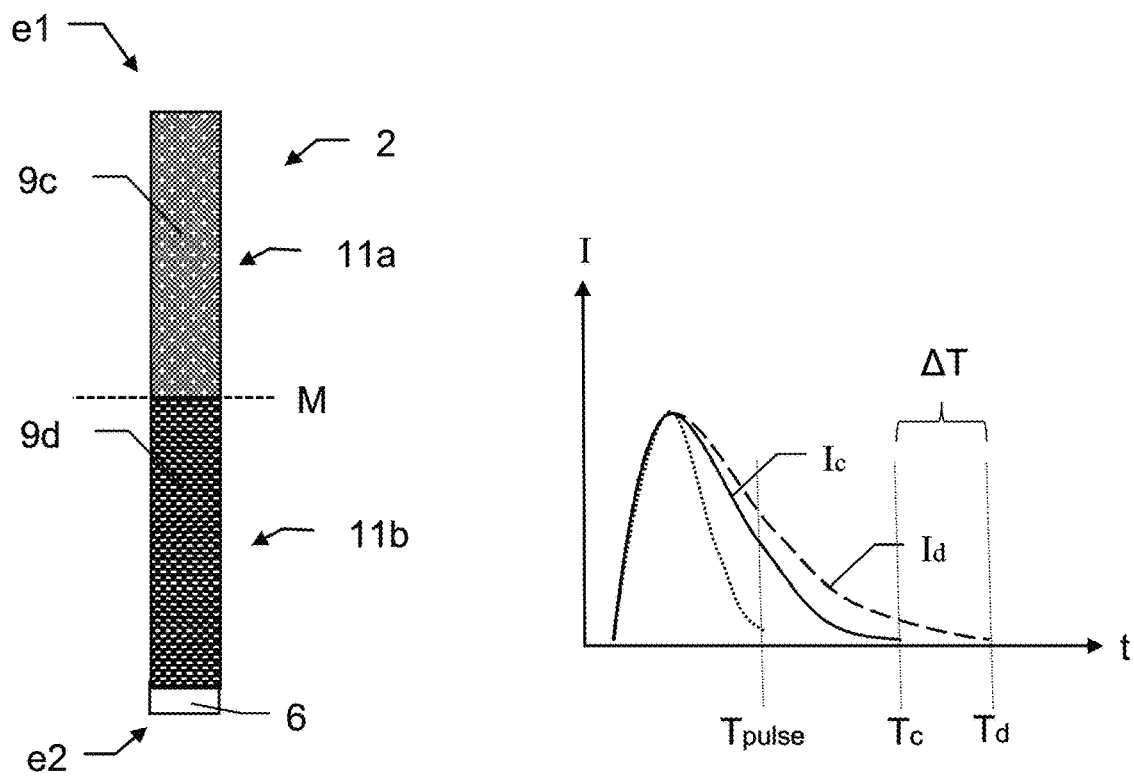
FIGS. 6a,b: show views of a further example of a light receptor according to the invention and corresponding signals and a concept for signal treatment.

FIG. 6a shows a further embodiment of a light receptor 2 according to the invention. Similar to the embodiment according to FIG. 3a, the light receptor 2 is divided in two halves 11a and 11b by two sorts of light absorbing and emitting material 9c and 9d, in the example designed as two phosphorescent materials 9c and 9d with different decay times Tc and Td. Light emitted by the materials 9c and 9d is detected by detection means 6, whereby the time difference ΔT is determined between the arrival or detection time Tc of the first signal of the first material 9c and the detection time Td of the second signal of the second material 9d as symbolized in the right side of FIG. 6a. If the time interval ΔT is greater than zero, than the position is in the upper half 11a, if the time interval ΔT is smaller than zero, than the position is in the lower half 11b. Preferably, the decay times Tc and Td are below 50 ms, but much larger than the pulse duration Tc of a reference light pulse, too. Such embodiments get by with only one detector 6 and offer the further advantage that they need only a relative simple signal processor for evaluation and position/orientation determination as only times are to be measured resp. evaluated. Further improved versions of the above concept comprise more than two phosphorescent materials with different decay times aligned along the receiving length of the light receiver.

Figure 6B:
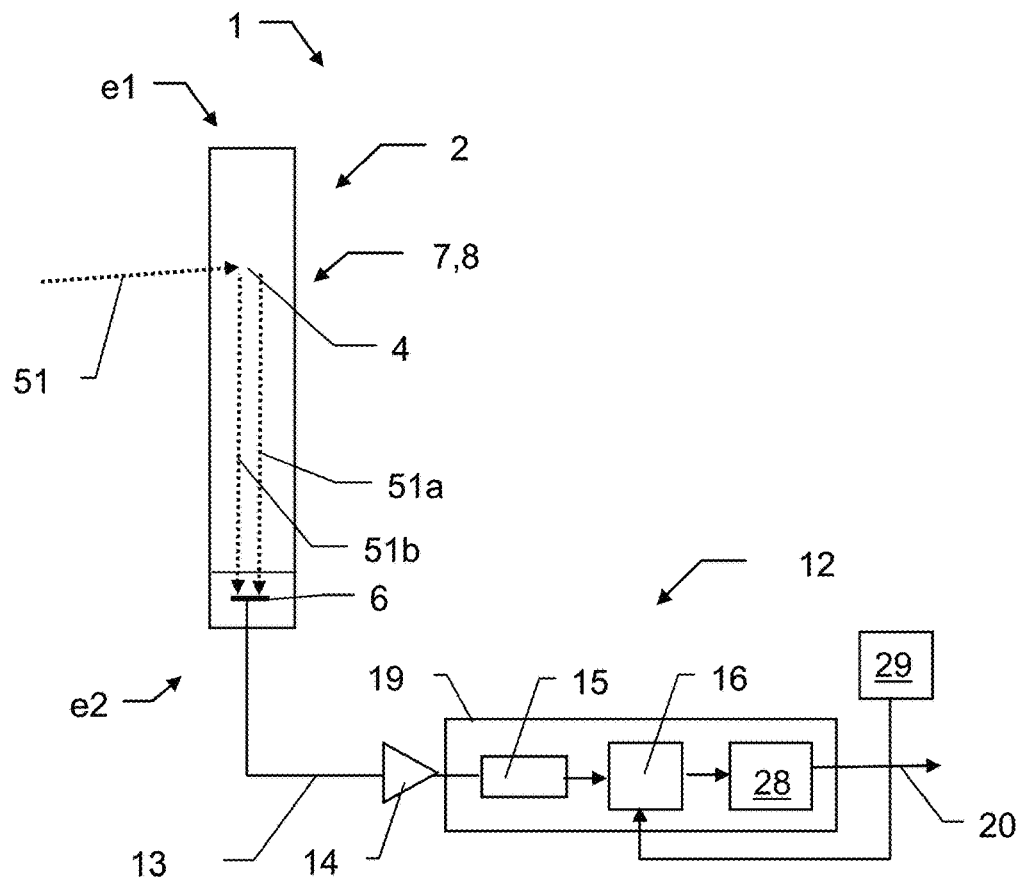

FIG. 6b shows a schematical view of a light receiver 1 with a light receptor 2 according to FIG. 6a. At end e2, light 51a coupled in by the first phosphorescent material 9c and light 51b coupled in by the second phosphorescent material 9d (see FIG. 6a) and guided to the end e2 by the light guide 7 is detected successively by high speed photo-sensor 6. Their signals are processed by the signal processor 12, wherein they are amplified by assigned electronic circuitries 14 and fed into a time measurement ASIC (TOF or phase meter) as for example used in hand-held distance meters. Alternatively the amplified signals also can be fed into a FPGA 19 as shown in FIG. 6b which operates a time-of-flight unit. The submodules inside the FPGA are a threshold discriminator 15 and time-to-digital converter (TDC) 16, which measure the time of the events by interpolation the time intervals of a precision master-clock 29 which acts as the time base the measurement unit. These time-measurement circuitries are well known to the experts in the field. The TDC 16 measures the time Tc and Td of the two events acting like trigger pulses and the time difference 20 (Td−Tc) is calculated by the time difference calculation unit 28.

Figure 7A:
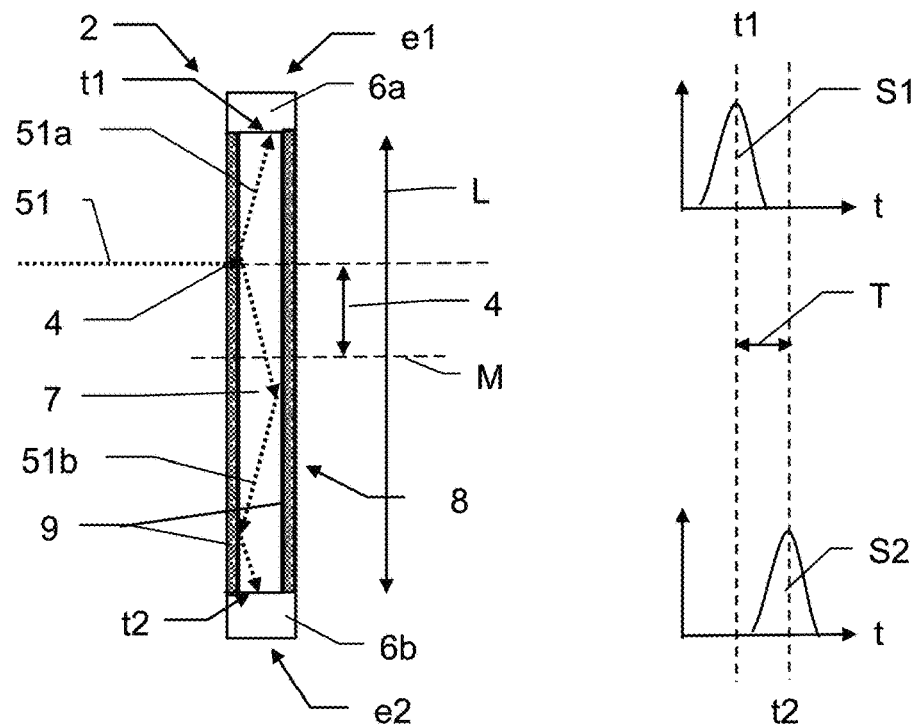
FIGS. 7a-c: show views of a further example of a light receptor according to the invention and corresponding signals and two concept for signal treatment.
Figure 7B:
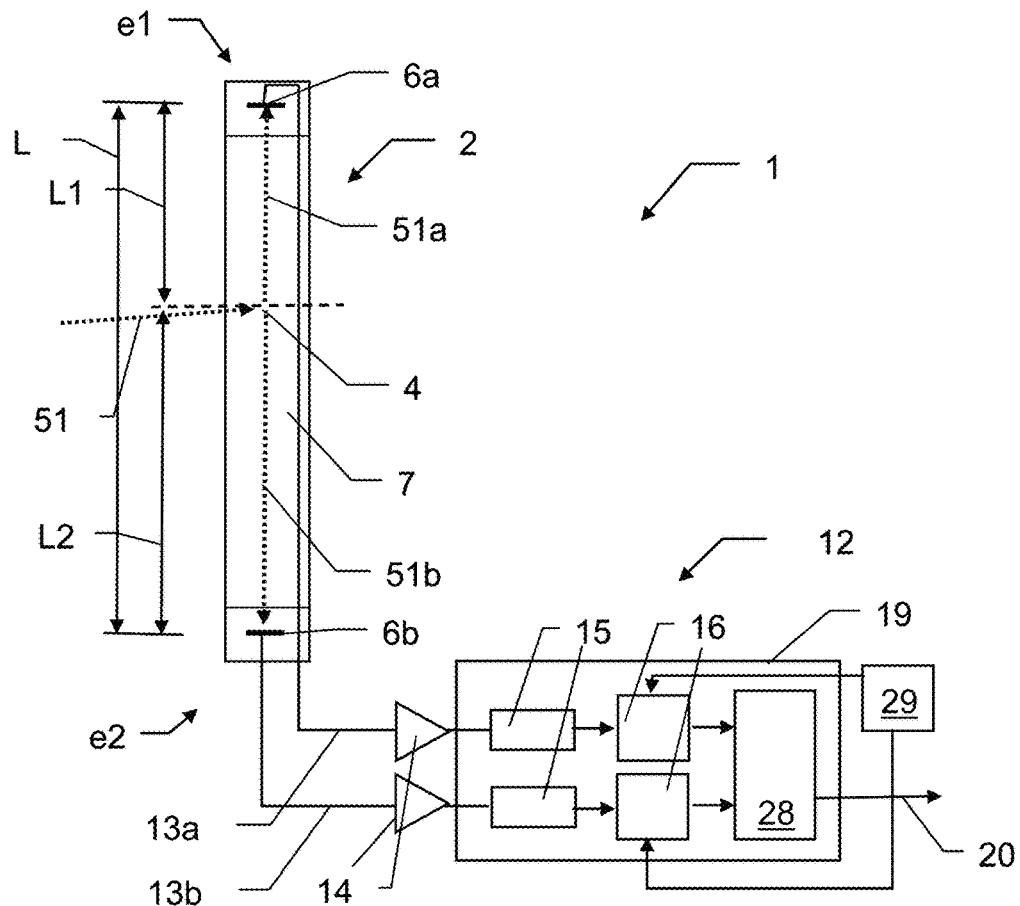
Figure 7C:
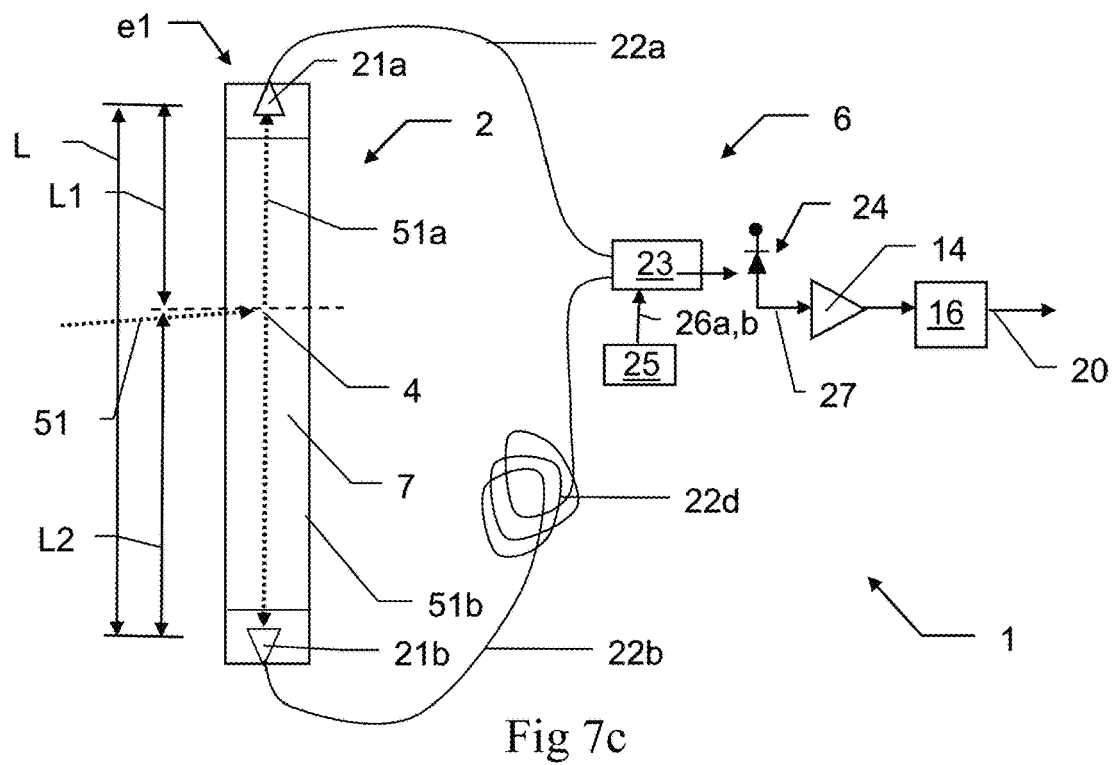

FIGS. 7a-7c illustrate another example of the position determination according to the invention.

In FIG. 7a, reference light 51 arrives at the light receiving part 2 at position 4. The light coupler 8—which in the example is situated such that it forms an outer wall of the light receptor 2 around the light guide 7 in the interior respectively forms cladding of the waveguide or is narrowly spaced to it—comprises light absorbing and emitting material 9 and couples at least part of the light into the light guide 7 using the principle of fluorescence or phosphorescence. The received light travels in both directions in the light guide 7, which is guiding in the wavelength region of the received light, serving as a light propagation path L, whereby one part of the received light 51a propagates in the light guide 7 to the first end e1 resp. first detector 6a and another part to the second end e2 resp. second detector 6b. The light guide 7 is for example a fiber-optic light guide such as a glass or quartz or polymeric fiber-optics.

The reference light 51 in the example is temporally modulated, consisting of a train of short pulses, for example with a pulse duration of less than 10 ns. Alternatively, the reference light can be modulated sinuously with a frequency around 10 MHz to 100 MHz. The first detector 6a then detects part of the light 51a of a light pulse and gives out a first detection signal S1 at time t1, the second detector detects another part 51b of the light of the same light pulse and gives out a second detection signal S2 at time t2. As both light parts 51a and 51b have the same light propagation speed c/n, wherein n is the effective refraction index of the light guide 7, and due to the shorter propagation path for the first received light 51a, the time t1 differs from t2 (the "upper" light pulse arrives at the detector before the "lower" light pulse), resulting in a time difference T of the reception of light at the respective ends resp. of the output of the detection signals S1 and S2. The time difference T varies dependent on the position 4 of the incident reference light 51.

Signal detection is for example done using well known sampling techniques or threshold techniques. The light receiver 1 preferably comprises a time-of-flight circuitry with a timing resolution in the millimeter range or even better. Further, it comprises a time base to read out the two light detectors 6a, 6b with the required timing precision, a signal processing unit, a calibration unit, an interface to send out the data and/or a visual indicator or display to show the difference between the actual position and the reference position (not shown).

Hence, this time difference T is determined by a time measurement unit for example consisting of a precision clock, a counter and a time interpolation unit implemented in a FPGA. The ranging system is controlled by the signal processor. The position 4 is determined as the product of the time difference T and the light propagation speed c/n of the light guide 7, divided by 2: cT/(2n) (in the example the position 4 is measured from the middle M of the light guide 7).

As an alternative to the use of two detectors 6a, 6b, only one detector 6a or 6b at one end e1 or e2 is present, whereas on the other end e2 or e1 a reflective element (mirror) is situated. Depending on the impinging position 4, there are always two different optical path lengths for each propagation direction (which would only be identical for the position 4 directly at the mirror). Thus, two pulses S1, S2 are generated, which are symmetrical about the time of one full length transit L. The position 4 can be determined form the time difference T between the first pulse S1 and second pulse S2.

Generally spoken (independent of a TOF-method/design resp. of the detection and evaluation method), the use of a detection unit 6 only on one end e1 or e2 of the receiving rod 2 in combination with a reflector on the other end of the rod e2 or e1 has the advantages of compact electronics, short electrical connections and thereof better signal integrity and of a true 360° detection window due to no obstructing electrical connections (antenna-like design).

Alternatively or in addition to position determination using a Time-of-Flight method as described above, a phase difference of the signals S1 and S2 is detected at each end e1 and e2. The Time-of-Flight method used here is comparable to the phase-difference method for measuring distance with sub-millimeter precision. For using a phase difference, the reference light 51 is harmonically modulated light, i.e.

the intensity I(t) as a function of time t is given by I(t)=I0+A×sin(2πft), where f indicates the modulation frequency, A the modulation amplitude and I0 the background and/or offset light level. By measuring the phase difference ΔΦ between the two harmonic signals produced at photodetectors 6a and 6b with the signal processor, using e.g. a phase shift detector, it is possible to calculate the position 4 of incident light 51 with respect to the middle M of the light guide 7 from cΔΦ/(4πfn).

Measuring the phase shift between two harmonic signals with the signal processor can be accomplished in several ways. If the electrical signal level is high enough, a direct lock-in detection technique can be employed, where one of the signals produced by photodetectors 6a or 6b is used to extract a reference clock signal for the demodulation of the signal of the other detector 6b or 6a. A second preferred method uses a reference light emitter such that it emits a radio-frequency signal of the same frequency as used for the modulation of the emitted reference light 51. The signal processor receives this RF signal and uses it for the demodulation of both signals produced by photodetectors 6a and 6b, making use of known lock-in detection and demodulation techniques. A third preferred method consists of sampling both signals at a fixed sampling frequency that is at least twice the maximum frequency of the modulated reference light 51. Both digitized signals are then Fourier-transformed, and in both Fourier transforms the frequency of maximum amplitude is determined through interpolation. For both frequencies, the corresponding phase shifts are determined. The difference ΔΦ of these two phase shifts is then used as described above to calculate the position 4 of incident light 51 with respect to the middle M of the light receiver using the above equation.

FIGS. 7b and 7c show two examples of a light receiver 1, illustrating the signal treatment of an embodiment according to FIG. 7a in more detail. The position or length 3 (cf. FIGS. 1a and 2) has to be determined. In the case that the end-tip of the support 100 is the reference point and attached to the end e1, then length 3 corresponds to the sum of support 100 and the length L1. The length L1 can be deduced from the length L and the measured difference (L1−L2) divided by two. Finally the impinging position 4 is known. Because it is not necessary to measure the length L1 and L2 separately but only their differences makes timing circuitry and calibration much easier. The difference (L1−L2) can directly be measured by the time difference between the two signals received at ends e1 and e2, irrelevant of a missing synchronization of the clock of the emitter and the clock of the time-of-flight or phase-difference measurement unit. The events t1,t2 at ends e1 and e2 act like a start and a stop trigger.

FIG. 7b shows an embodiment of the invention based on a distance measurement unit comprising two signal channels 13a, 13b. At each end e1,e2 the radiation coupled in by the light coupler (not shown) using the principle light absorbance and emittance and guided to the respective end e1, e2 by the light guide 7 is detected by high speed photo-sensors 6a, 6b. Their signals are processed by the signal processor 12, wherein they are amplified by assigned electronic circuitries 14 and fed into a time measurement ASIC (TOF or phase meter) as for example used in hand-held distance meters (see FIG. 7c). Alternatively the amplified signals also can be fed into a common FPGA 19 as shown in FIG. 7b which operates as two combined time-of-flight units. The submodules inside the FPGA are threshold discriminators 15 and time-to-digital converters (TDC) 16, which measure the time of the events by interpolation the time intervals of a precision master-clock 29 which acts as the time base for both time measurement units together. These time-measurement circuitries are well known to the experts in the field. The two TDCs 16 measure the time t1, t2 of the two events acting like trigger pulses and the difference (L1−L2) is the time difference 20 (t2−t1) calculated by the time difference calculation unit 28 multiplied by the effective speed of light inside the light guide 7.

FIG. 7c shows an alternative embodiment of the invention consisting of a single time-of-flight distance measurement unit. In this case the optical signals 51a, 51b detected at each end e1,e2 responsive to reference light received by coupling in and guiding is fed into optical fibers 22a, 22b by light collector and fiber-coupling units 21a, 21b and guided to an optical combiner 23 such that both optical signals 51a, 51b arrive at a single photodiode 24, where they are detected separately (i.e. independently from each other) in two separate detection operations. Thus downstream there is only one electronic signal path 27. The photo-electronic signal is amplified by amplifier 14 and given into a time measurement unit 16 which puts out the time difference 20. The time measurement unit 16 is for example a time measurement ASIC or a waveform digitizer comprising a high-speed ADC for digitizing the received signal pulses and an FPGA for signal processing and determining the time interval between the two pulses. Preferably, in order to identify the two arriving optical pulses 51a, 51b (and to ensure separate light detection operations) the time delay between the two fibers 22a and 22b must be longer than the active rod length L. When using optical fibers 22a, 22b, 22d the realization of a delay line 22d is simple and the length L of the light receptor 2 can be of several meters. Further advantages are facilitating of compact electronics and short electrical connections and thereof better signal integrity.

Potential temperature drifts can be calibrated by test pulses 26a, 26b, generated by a calibration light source 25 such as a calibration LED or laser source. Such test pulses 26a,b can be realised by built-in LEDs inside the light receptor 2 in the center, or somewhere within the length L, or at both ends e1,e2. Illustrated is an external LED 25 which radiates the optical fibers upstream. The two revolving signals responsive to the light pulses 26a,b are detected and processed like normal received signals. The measured time difference of these two artificial calibration signals can be used for absolute calibration of the light receiver.

What is claimed is:
1. A light receiver designed to determine a position or orientation relative to a reference light in form of a free light beam or light fan, the light receiver comprising:
   an elongated rod-shaped light receptor with two ends;
   a light coupler;
   a light guide; and
   a light detection means configured for light detection at one or both ends,
   wherein the light coupler and the light guide are designed to receive and conduct at least part of the reference light impinging on the light receptor towards one or both ends such that reference light is detectable by the detection means,
   wherein the light detection means is designed to put out at least one signal responsive to reference light detected at a respective end of the light receptor,
   wherein the light receiver further comprises a signal processor to process the signal generated by the light detection means and to determine the relative position or orientation by evaluation of the signal, and wherein the light coupler comprises at least one light absorbing and emitting material, wherein the at least one light absorbing and emitting material is configured to:

absorb reference light and sub sequentially emit light of a wavelength different to that of the reference light; and emit light to a different solid angle than that of the incident reference light.

2. The light receiver as claimed in claim 1, wherein the light coupler and the light guide are designed such that impinging reference light is absorbed at least partly by the light coupler and at least part of light emitted subsequently by the light coupler is conducted by the light guide.

3. The light receiver as claimed in claim 1, wherein the light guide:

is configured for guiding light in the wavelength region of the light coupled in by the light coupler;

is configured for guiding light virtually lossless; or is configured as a multimode or single-mode optical waveguide based on the principle of guided waves or as a light pipe relying on total internal reflection.

4. The light receiver as claimed in claim 1, wherein the signal processor is configured to determine the position or orientation based on:

a Time-of-Flight difference or phase difference of light detected at both ends, an intensity of the detected light, rise and decay times of the detected light, frequency of the detected light, or spectral intensities of the detected light.

5. The light receiver as claimed in claim 1, wherein the light receptor:

is divided into two parts by an optical barrier preventing light transmission between the two parts, and the detection means are designed to detect light at each end, or comprises at least two coupling and guiding elements of different length, arranged adjacent and parallel to each other and dividing the light receptor in at least two parts and wherein the detection means is configured for detecting light of each coupling and guiding element.

6. A light receiver designed to determine a position or orientation relative to a reference light in form of a free light beam or light fan, the light receiver comprising:

an elongated rod-shaped light receptor with two ends;

a light coupler;

a light guide; and a light detection means configured for light detection at one or both ends, wherein the light coupler and the light guide are designed to receive and conduct at least part of the reference light impinging on the light receptor towards one or both ends such that reference light is detectable by the detection means, wherein the light detection means is designed to put out at least one signal responsive to reference light detected at a respective end of the light receptor, wherein the light receiver further comprises a signal processor to process the signal generated by the light detection means and to determine the relative position or orientation by evaluation of the signal, and wherein the light coupler comprises at least one light absorbing and emitting material, and wherein the light absorbing and emitting material is distributed non-uniformly along a receiving length.

7. A light receiver designed to determine a position or orientation relative to a reference light in form of a free light beam or light fan, the light receiver comprising:

an elongated rod-shaped light receptor with two ends;

a light coupler;

a light guide; and a light detection means configured for light detection at one or both ends, wherein the light coupler and the light guide are designed to receive and conduct at least part of the reference light impinging on the light receptor towards one or both ends such that reference light is detectable by the detection means, wherein the light detection means is designed to put out at least one signal responsive to reference light detected at a respective end of the light receptor, wherein the light receiver further comprises a signal processor to process the signal generated by the light detection means and to determine the relative position or orientation by evaluation of the signal, and wherein the light coupler comprises at least one light absorbing and emitting material, and wherein the light coupler comprises:

at least two light absorbing and emitting materials with different Stokes shifts, or at least two phosphorescent materials as at least two light absorbing and emitting materials with different decay times.

8. The light receiver as claimed in claim 1, wherein the light guide serves as a light propagation path of defined length for light coupled into the light guide by the light coupler and the position or orientation is determined based on light propagation speed of the reference light propagating in the light guide.

9. The light receiver as claimed in claim 1, wherein:

a receiving length of the light receptor is at least 1 cm, or the light detection means comprises at least one of positive intrinsic negative-diodes, single photon avalanche-diodes, avalanche photo-diodes or charge coupled device, or the position is specifying a vertical offset to a reference plane defined by the reference light, or the signal processor comprises a time measurement unit for determining a time or time difference of the signals.

* * * * *